US012688746B2

(12) United States Patent
Kataoka et al.

(10) Patent No.: US 12,688,746 B2
(45) Date of Patent: Jul. 21, 2026

(54) MONEY HANDLING SYSTEM, MONEY HANDLING METHOD, AND MONEY HANDLING APPARATUS

(71) Applicant: Glory Ltd., Himeji (JP)

(72) Inventors: Ryuji Kataoka, Hyogo (JP); Shigeo Namura, Hyogo (JP); Hiroki Imori, Hyogo (JP); Shota Sakaue, Hyogo (JP); Atsushi Yukawa, Hyogo (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 17/695,870

(22) Filed: Mar. 16, 2022

(65) Prior Publication Data

US 2022/0301378 A1 Sep. 22, 2022

(30) Foreign Application Priority Data

Mar. 19, 2021 (JP) ................................ 2021-046292

(51) Int. Cl.
*G07D 11/12* (2019.01)
*G07D 11/00* (2019.01)
(Continued)

(52) U.S. Cl.
CPC ............ *G07D 11/12* (2019.01); *G07D 11/16* (2019.01); *G07D 11/24* (2019.01); *G07D 11/30* (2019.01)

(58) Field of Classification Search
CPC ...... G07D 11/12; G07D 11/245; G07D 11/24; G07D 11/16; G07D 11/30; G07D 2211/00;
(Continued)

(56) References Cited

U.S. PATENT DOCUMENTS 7,264,150 B1 * 9/2007 Moreland ........... G07G 1/0009 235/379
8,430,303 B1 * 4/2013 Sanders ............ G06Q 20/1085 235/379

(Continued)

FOREIGN PATENT DOCUMENTS

| | | | | |
|---|---|---|---|---|
| CA | 2818494 A1 * | 12/2013 | ............ | G07F 9/002 |
| DE | 10 2018 007564 A1 | 3/2020 | | |
| WO | 2012/114449 A1 | 8/2012 | | |

OTHER PUBLICATIONS

Controls on Casino Transaction Kiosks at Great Mountain Casino: A Case Study (Year: 2010).*

(Continued)

*Primary Examiner* — Thien T Mai
(74) *Attorney, Agent, or Firm* — XSENSUS LLP

(57) ABSTRACT

A money handling system includes a first money handling apparatus including a first money discharge unit that discharges money in a state suitable for a first transport manner, a second money discharge unit that discharges money in a state suitable for a second transport manner, and a discharge control unit that controls the first and second money discharge units; and a second money handling apparatus including a first money reception unit that receives money transported in the first transport manner, a second money reception unit that receives money transported in the second transport manner, and a reception control unit that controls the first money reception unit and the second money reception unit. The discharge control unit transmits first information indicating that money is discharged from the first money discharge unit, and the reception control unit causes the first money reception unit to operate when the first information is received.

12 Claims, 7 Drawing Sheets

(51) Int. Cl.
*G07D 11/16* (2019.01)
*G07D 11/24* (2019.01)
*G07D 11/30* (2019.01)

(58) Field of Classification Search
CPC .... G07D 11/0087; G07D 11/40; G07D 11/14; G07D 11/125; G07D 11/13; G07F 19/20; G07F 19/203; G07F 19/201; G07F 19/202; G07F 19/00; G07F 9/06; G06F 13/00
See application file for complete search history.

(56) References Cited

U.S. PATENT DOCUMENTS

| | | | | |
|---|---|---|---|---|
| 8,534,207 | B2 * | 9/2013 | Villiger | E05G 1/06 109/57 |
| 11,403,210 | B1 * | 8/2022 | McCabe | G06Q 40/02 |
| 2007/0187485 | A1 * | 8/2007 | Aas | G07D 11/24 235/379 |
| 2014/0060997 | A1 * | 3/2014 | Doi | G07D 11/24 194/206 |
| 2021/0398381 | A1 | 12/2021 | Jakobs | |

OTHER PUBLICATIONS

Extended European Search Report issued Aug. 25, 2022 in corresponding European Patent Application No. 22162571.8, 10 pages.

* cited by examiner

MONEY HANDLING SYSTEM, MONEY HANDLING METHOD, AND MONEY HANDLING APPARATUS

CROSS-REFERENCE TO RELATED APPLICATION

This application claims priority to Japanese Patent Application No. 2021-046292, filed on Mar. 19, 2021, the disclosure of which is incorporated herein by reference in its entirety.

TECHNICAL FIELD

The present disclosure relates to a money handling system, a money handling method, and a money handling apparatus that handle money.

BACKGROUND

In retailers such as supermarkets, convenience stores, and department stores, a money handling system that handles money and performs various kinds of processing has been spread. The money handling system comprises money handling apparatuses such as a cash settlement apparatus that calculates the price that customers are to pay and a cash accounting apparatus that prepares a change fund to refill the cash settlement apparatus, collects proceeds from sales from the cash settlement apparatus, and manages them.

For example, money is transported between the cash settlement apparatus and the cash accounting apparatus to refill the cash settlement apparatus with a change fund and to collect proceeds from sales. The money is transported, for example, by a store clerk or the like. There are a plurality of transport units, and any of the plurality of transport units can be selected depending on the money handling system. Note that examples of the transport units comprise containers such as a money cassette and a bag for transportation that stores money and keeps the money untouchable from the outside during transportation. It is also considered that the store clerk carries the money by hand.

For example, a typical cash handling system is disclosed in PTL 1 in which money is transportable between the cash settlement apparatus and the cash accounting apparatus uses a cash transporting cassette.

CITATION LIST

Patent Literature

PTL 1
WO 2012/114449

SUMMARY

Technical Problems

In a typical money handling system in which money is transportable between the cash settlement apparatus and the cash accounting apparatus by a plurality of transport methods, each apparatus may comprise money reception units corresponding to the respective transport units. For example, a typical cash accounting apparatus comprises an inlet that enables selective deposit of loose money (money that is not stored in a money cassette and is carried by a store clerk in a loose state) and deposit of money from a money cassette.

In such a case, a store clerk needs to select a unit for depositing money in the money handling apparatus suitable for the transport method. Since such a selection operation is time-consuming and bothersome, improvement has been desired.

Solutions to Problems

In view of such circumstances, the present disclosure provides a money handling system and a money handling method that enable deposit of transported money in a money handling apparatus quickly and effortlessly. The present disclosure also provides a money handling apparatus in which transported money can be deposited quickly and effortlessly.

A money handling system according to an aspect of the present disclosure comprises: a first money handling apparatus comprising a first money discharge unit that discharges money in a state suitable for a first transport manner, a second money discharge unit that discharges money in a state suitable for a second transport manner, and a discharge control unit that controls the first money discharge unit and the second money discharge unit; and a second money handling apparatus comprising a first money reception unit that receives money transported in the first transport manner, a second money reception unit that receives money transported in the second transport manner, and a reception control unit that controls the first money reception unit and the second money reception unit, in which the discharge control unit transmits first information indicating that money is discharged from the first money discharge unit, and the reception control unit causes the first money reception unit to operate, in a case that the first information is received.

In the money handling system according to the aspect of the present disclosure, the reception control unit may cause the second money reception unit to operate, in a case that the first information is not received. In particular, the reception control unit may cause the second money reception unit to operate, in a case that the first information is not received before or at a timing at which a reception request for receiving money is made.

In the money handling system according to the aspect of the present disclosure, the discharge control unit may transmit second information indicating that money is discharged from the second money discharge unit, and the reception control unit may cause the second money reception unit to operate, in a case that the second information is received.

In the money handling system according to the aspect of the present disclosure, the discharge control unit may transmit the first information in a case that money is discharged from the first money handling apparatus.

In the money handling system according to the aspect of the present disclosure, the discharge control unit may transmit the first information in a case that a transmission request is received from the reception control unit.

The money handling system according to the aspect of the present disclosure may further comprise a management apparatus that receives the first information from the discharge control unit and transmits the first information to the reception control unit.

In the money handling system according to the aspect of the present disclosure, the second transport manner may be a manner in which money is transported in a state of being stored in a money cassette that is configured to be capable of being attached to the second money discharge unit and also capable of being removed from the second money discharge unit, and the second money reception unit may be configured such that the money cassette is capable of being attached and removed.

In the money handling system according to the aspect of the present disclosure, the second money reception unit may comprise a lock mechanism that prevents the money cassette from being attached, and, in a case that the first money reception unit is to receive money, the reception control unit may cause the lock mechanism to operate and may set a state where the money cassette is incapable of being attached to the second money reception unit.

A money handling apparatus according to an aspect of the present disclosure comprises: a first money reception unit that receives money transported in a first transport manner; a second money reception unit that receives money transported in a second transport manner; and a reception control unit that controls the first money reception unit and the second money reception unit, in which the reception control unit causes the first money reception unit to operate, in a case that first information indicating that money is in a state suitable for the first transport manner is received.

A money handling method according to an aspect of the present disclosure comprises: discharging, from a first money handling apparatus, money in a state suitable for a first transport manner or in a state suitable for a second transport manner; transmitting first information indicating that money discharged from the first money handling apparatus is in a state suitable for the first transport manner; and receiving money by selecting at least one money reception unit from among a plurality of money reception units in a case that a second money handling apparatus receives the first information when receiving the money discharged from the first money handling apparatus.

Advantages

According to one or more aspects of the present disclosure, transported money can be deposited quickly and effortlessly.

DETAILED DESCRIPTION

Now, aspects of the present disclosure will be described below in detail with reference to the drawings. Note that description that is detailed more than necessary, for example, detailed description of well-known matters, repeated description of substantially the same configuration, and the like will be omitted in some cases. In addition, the following description and the drawings to be referred to are provided for persons skilled in the art to understand the present disclosure and are not intended to limit the claims of the present disclosure. For example, matters described in a certain embodiment may also apply to another embodiment, or an element comprised in a certain embodiment may be comprised in another embodiment.

Embodiment 1

[Configuration]

Figure 1:
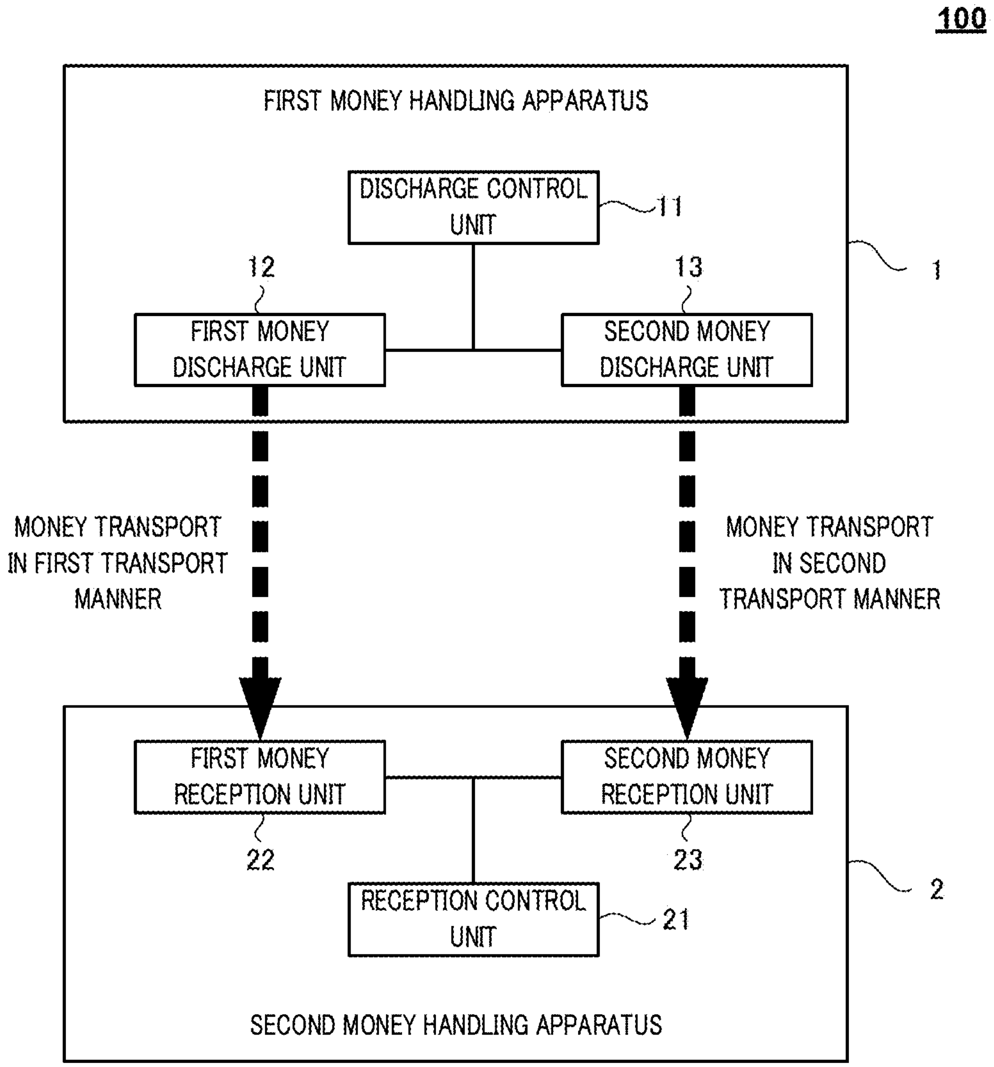
FIG. 1 illustrates the configuration of a money handling system according to one or more aspects of the disclosed subject matter.

First, the configuration of a money handling system 100 according to Embodiment 1 of the present disclosure will be described. As illustrated in FIG. 1, the money handling system 100 comprises a first money handling apparatus 1 and a second money handling apparatus 2.

Each of the first money handling apparatus 1 and the second money handling apparatus 2 is an apparatus that can store money and that handles money.

As illustrated in FIG. 1, the first money handling apparatus 1 comprises a discharge control unit 11, a first money discharge unit 12, and a second money discharge unit 13. The first money discharge unit 12 is configured to discharge money in a state suitable for a first transport manner. In addition, the second money discharge unit 13 is configured to discharge money in a state suitable for a second transport manner. The first transport manner and the second transport manner are transport manners that are different from each other. The discharge control unit 11 controls discharge of money from the first money discharge unit 12 and discharge of money from the second money discharge unit 13. The discharge control unit 11 is a processor such as a central processing unit (CPU). The first and second transport manners will be described later in detail in Embodiment 4. In an exemplary implementation, the discharge control unit 11 is encompassed by or may include processing circuitry which will be discussed later with respect to FIG. 7.

Money discharged from the first money discharge unit 12 is transported to the second money handling apparatus 2 in the first transport manner. In addition, money discharged from the second money discharge unit 13 is transported to the second money handling apparatus 2 in the second transport manner.

As illustrated in FIG. 1, the second money handling apparatus 2 comprises a reception control unit 21, a first money reception unit 22, and a second money reception unit 23. The first money reception unit 22 is configured to receive money transported in the first transport manner. The second money reception unit 23 is configured to receive money transported in the second transport manner. The reception control unit 21 controls reception of money at the first money reception unit 22 and reception of money at the second money reception unit 23. The reception control unit 21 is a processor such as a CPU. In an exemplary implementation, the reception control unit 21 is encompassed by or may include processing circuitry which will be discussed later with respect to FIG. 7. Reception of money at the first money reception unit 22 and the second money reception unit 23, the money being transported in either transport manner, will be described later in detail in Embodiment 4.

[Operations]

Figure 2:
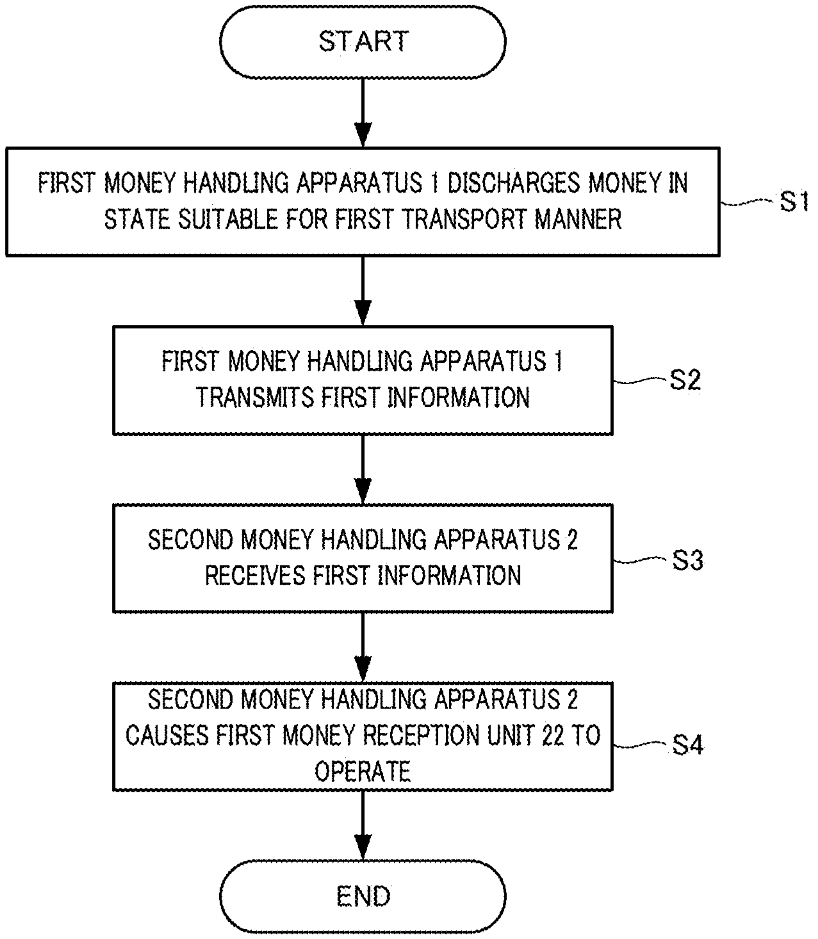
FIG. 2 is a flowchart for describing operations of the money handling system according to one or more aspects of the disclosed subject matter.

Referring to FIG. 2, an operation example of the money handling system 100 according to one or more aspects of the disclosed subject matter will be described.

First, in step S1, the first money handling apparatus 1 discharges money in a state suitable for the first transport manner. The money is discharged from the first money discharge unit 12 illustrated in FIG. 1 in step S1.

Upon discharge of the money in a state suitable for the first transport manner in step S1, the first money handling apparatus 1 generates first information indicating that money is discharged in a state suitable for the first transport manner. In step S2, the first money handling apparatus 1 transmits the generated first information.

In step S3, the second money handling apparatus 2 receives the first information. The first information transmitted from the first money handling apparatus 1 may be directly received by the second money handling apparatus 2. Alternatively, the first information transmitted from the first money handling apparatus 1 may be received once by another apparatus and may be transmitted again to the second money handling apparatus 2, and the second money handling apparatus 2 may receive the first information.

In step S4, on the basis of reception of the first information, the second money handling apparatus 2 causes the first money reception unit 22 to operate. Thus, the money discharged from the first money discharge unit 12 in a state suitable for the first transport manner and transported from the first money handling apparatus 1 to the second money handling apparatus 2 in the first transport manner is received by the first money reception unit 22.

Thus, when the money transported from the first money handling apparatus 1 in the first transport manner is deposited in the second money handling apparatus 2, in the second money handling apparatus 2, the first money reception unit 22 that receives the money transported in the first transport manner automatically operates, enabling smooth and quick deposit. In addition, an operator who is to deposit money in the second money handling apparatus 2 does not need to additionally perform an operation on the second money handling apparatus 2 for receiving the money transported in the first transport manner, in other words, an operation for causing the first money reception unit 22 to operate. Thus, the operator can deposit money in the second money handling apparatus 2 effortlessly.

Embodiment 2

Figure 3:
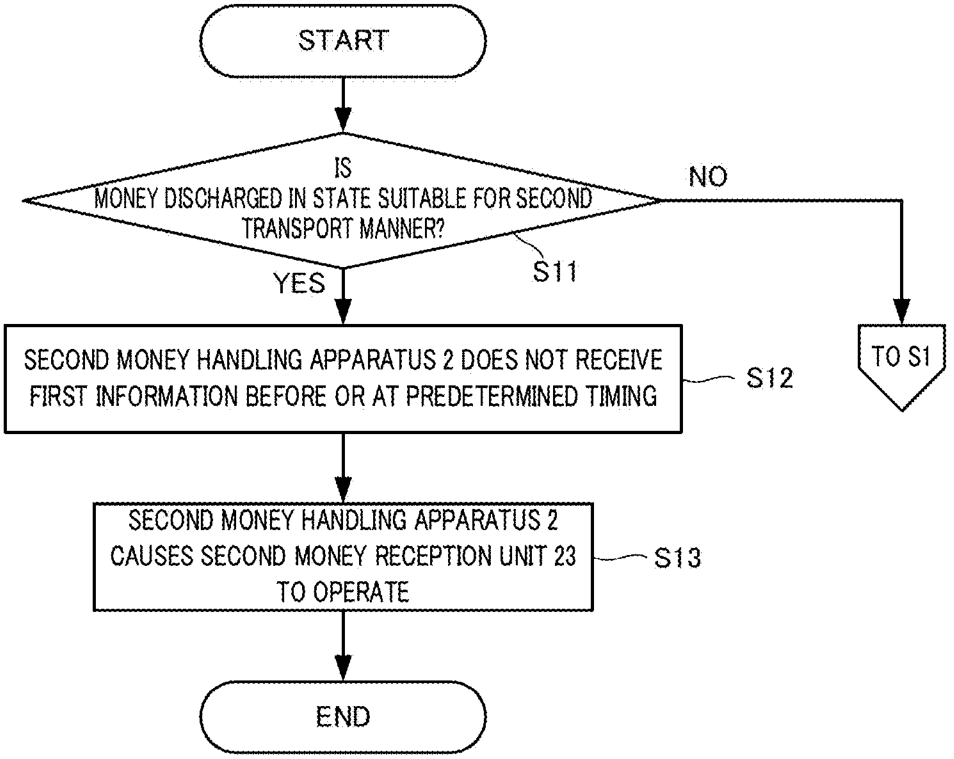
FIG. 3 is a flowchart for describing operations of the money handling system according to one or more aspects of the disclosed subject matter.

Next, the money handling system 100 according to Embodiment 2 will be described. The configuration of the money handling system 100 according to Embodiment 2 is the same as the configuration of the money handling system 100 according to Embodiment 1 illustrated in FIG. 1. In Embodiment 2, referring to FIG. 3, an operation example of the money handling system 100 in a case where money is discharged from the first money handling apparatus 1 in a state suitable for the second transport manner will be described.

In step S11, the first money handling apparatus 1 determines whether money is discharged in a state suitable for the second transport manner. When it is determined that money is discharged in a state suitable for the second transport manner, the process advances to step S12; if not, the process returns to step S1 illustrated in FIG. 2. The process at and after step S1 is the same as that described above in Embodiment 1, and thus, description thereof will be omitted.

When it is determined in step S11 that money is discharged in a state suitable for the second transport manner, the first money handling apparatus 1 does not generate information indicating that money is discharged in a state suitable for the second transport manner.

That is, the first money handling apparatus 1 generates the first information when money is discharged in a state suitable for the first transport manner as in Embodiment 1, but generates no information when money is discharged in a state suitable for the second transport manner.

Thus, in step S12, the second money handling apparatus 2 does not receive the first information before or at a predetermined timing. The predetermined timing is, for example, a timing at which a person who transports the money from the first money handling apparatus 1 to the second money handling apparatus 2 performs a deposit request operation on the second money handling apparatus 2.

In this case, in step S13, on the basis of no reception of the first information before or at the predetermining timing, the second money handling apparatus 2 causes the second money reception unit 23 to operate. Thus, the money discharged from the second money discharge unit 13 in a state suitable for the second transport manner and transported from the first money handling apparatus 1 to the second money handling apparatus 2 in the second transport manner is received by the second money reception unit 23.

Thus, when the money transported from the first money handling apparatus 1 in the second transport manner is deposited in the second money handling apparatus 2, in the second money handling apparatus 2, the second money reception unit 23 that receives the money transported in the second transport manner automatically operates, enabling smooth and quick deposit. In addition, an operator who is to deposit money in the second money handling apparatus 2 does not need to additionally perform an operation on the second money handling apparatus 2 for receiving the money transported in the second transport manner, in other words, an operation for causing the second money reception unit 23 to operate. Thus, the operator can deposit money in the second money handling apparatus 2 effortlessly.

Embodiment 3

Figure 4:
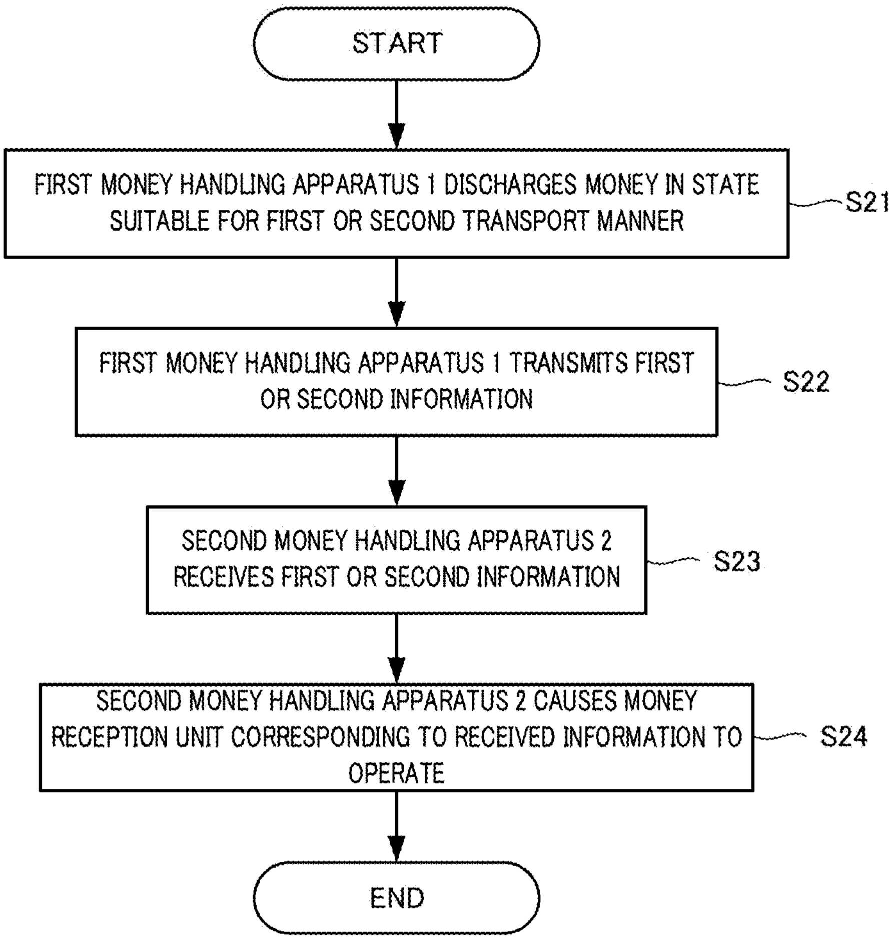
FIG. 4 is a flowchart for describing operations of the money handling system according to one or more aspects of the disclosed subject matter.

Next, the money handling system 100 according to Embodiment 3 will be described. The configuration of the money handling system 100 according to Embodiment 3 is the same as the configuration of the money handling system 100 according to Embodiment 1 illustrated in FIG. 1. In Embodiment 3, referring to FIG. 4, an operation example of the money handling system 100 in a case where money is discharged from the first money handling apparatus 1 in a state suitable for either the first transport manner or the second transport manner will be described.

In step S21, the first money handling apparatus 1 discharges money in a state suitable for the first transport manner or the second transport manner. The money is discharged from the first money discharge unit 12 or the second money discharge unit 13 illustrated in FIG. 1 in step S21.

Upon discharge of the money in a state suitable for the first transport manner in step S21, the first money handling apparatus 1 generates first information indicating that money is discharged in a state suitable for the first transport manner.

On the other hand, upon discharge of the money in a state suitable for the second transport manner in step S21, the first money handling apparatus 1 generates second information indicating that money is discharged in a state suitable for the second transport manner.

In step S22, the first money handling apparatus 1 transmits the generated first information or second information.

In step S23, the second money handling apparatus 2 receives the transmitted first information or second information.

Subsequently, in step S24, the second money handling apparatus 2 causes a money reception unit to operate, the money reception unit corresponding to the received information. That is, when the first information is received, the second money handling apparatus 2 causes the first money reception unit 22 to operate; when the second information is received, the second money handling apparatus 2 causes the second money reception unit 23 to operate.

Thus, when the money transported from the first money handling apparatus 1 in the second transport manner is deposited in the second money handling apparatus 2, in the second money handling apparatus 2, on the basis of the received information, which is either the first information or the second information, a money reception unit corresponding to the transport manner automatically operates. This enables smooth and quick deposit. In addition, an operator who is to deposit money in the second money handling apparatus 2 does not need to additionally perform an operation on the second money handling apparatus 2 for receiving the money in accordance with the transport manner, in other words, an operation for causing a money reception unit to operate, the money reception unit corresponding to the transport manner. Thus, the operator can deposit money in the second money handling apparatus 2 effortlessly.

Embodiment 4

A money handling system 100A according to Embodiment 4 will be described. The money handling system 100A is assumed to be installed in, for example, a retailer (hereinafter simply referred to as store) such as a specialty store, a convenience store, or a supermarket.

[Configuration]

Figure 5:
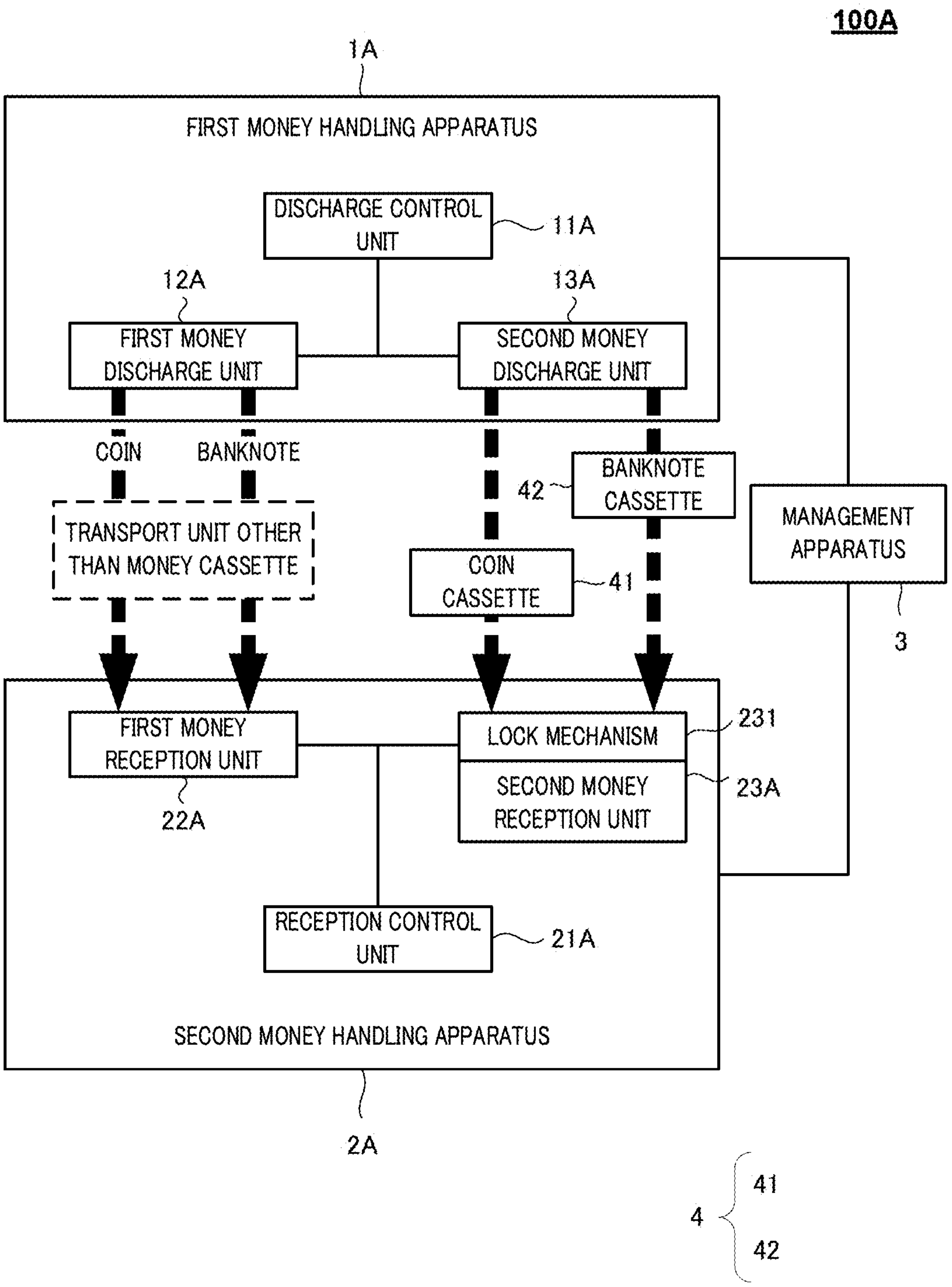
FIG. 5 illustrates the configuration of a money handling system according to one or more aspects of the disclosed subject matter.

As illustrated in FIG. 5, the money handling system 100A comprises a first money handling apparatus 1A, a second money handling apparatus 2A, a management apparatus 3, and a money cassette 4. Note that the money handling system 100A in the example illustrated in FIG. 5 comprises the single first money handling apparatus 1A, but may also comprise a plurality of first money handling apparatuses 1A. The first money handling apparatus 1A and the second money handling apparatus 2A are communicably connected to each other by wired or wireless communication via the management apparatus 3. Note that in FIG. 5, the solid line illustrates communicable connection, and the comparatively thick broken arrows schematically illustrate transport directions of money.

The first money handling apparatus 1A is installed on a checkout counter, which is an example of a front office of a store. The first money handling apparatus 1A is a cash settlement apparatus that is operated by a store clerk or a store customer and is used for settlement processing when the customer pays the price. Note that the store clerk herein means a person who belongs to the store, such as an employee or a manager of the store.

The first money handling apparatus 1A receives the price from the customer and returns change if necessary. The first money handling apparatus 1A may be communicably connected to a point of sale (POS) register operated by a store clerk or a shelf-checkout register operated by a customer. In addition, the first money handling apparatus 1A may be configured to be integrated with the POS register or the shelf-checkout register.

The second money handling apparatus 2A is a cash accounting apparatus that manages money in the store. The second money handling apparatus 2A prepares a change fund to refill the first money handling apparatus 1A, which is a cash settlement apparatus, collects proceeds from sales from the first money handling apparatus 1A, and manages them.

When proceeds from sales or the like are collected, the money needs to be transported from the first money handling apparatus 1A to the second money handling apparatus 2A. In this embodiment, the money is transported in either a transport manner using a transport unit other than the money cassette 4 or a transport manner using the money cassette 4.

This embodiment will describe, as an example, a case where the transport manner using a transport unit other than the money cassette 4 corresponds to the first transport manner and the transport manner using the money cassette 4 corresponds to the second transport manner.

The first money handling apparatus 1A comprises a discharge control unit 11A, a first money discharge unit 12A, and a second money discharge unit 13A. The first money discharge unit 12A discharges money in a state suitable for a transport unit other than the money cassette 4. The first money discharge unit 12A is configured to be capable of discharging coins and banknotes separately.

The transport unit other than the money cassette 4 is, for example, a unit that transports money in a loose state. Examples of the transport unit other than the money cassette 4 comprise hands of a store clerk and a container such as a bag. The loose state herein means a state in which money is in a loose state. Note that money in a loose state may also be referred to as loose money in the following description.

The first money discharge unit 12A discharges coins or banknotes from, for example, a coin-only outlet or a banknote-only outlet. A store clerk transports loose coins or loose notes discharged from the first money discharge unit 12A by hand or by putting them in a container such as a bag. As described above, in this embodiment, the transport manner using a transport unit other than the money cassette 4 is an example of the first transport manner in an embodiment of the present disclosure. The transport manner using a transport unit other than the money cassette 4 comprises a manner of transporting only coins in a loose state, a manner of transporting only banknotes in a loose state, and a manner of transporting mixed coins and banknotes in a loose state.

On the other hand, the second money discharge unit 13A discharges money in a state suitable for the transport manner using the money cassette 4. The second money discharge unit 13A is configured to be capable of discharging coins and banknotes separately, as in the first money discharge unit 12A.

Here, the money cassette 4 will be described. The money cassette 4 is an apparatus that can store money and is portable. The money cassette 4 can be attached to the first money handling apparatus 1A and also can be attached to the second money handling apparatus 2A. The money cassette 4 is configured such that money can be put therein and can be taken out therefrom in a state where the money cassette 4 is attached to the first money handling apparatus 1A or the second money handling apparatus 2A.

While being removed from the first money handling apparatus 1A and the second money handling apparatus 2A, the money cassette 4 can be carried by a store clerk by hand, for example. The money cassette 4 is configured such that money therein is not to betaken out from the outside while being removed from the first money handling apparatus 1A and the second money handling apparatus 2A. Thus, by using the money cassette 4, money can be transported safely.

The money cassette 4 comprises a coin cassette 41 and a banknote cassette 42. The coin cassette 41 is a cassette in which only coins can be stored. The banknote cassette 42 is a cassette in which only banknotes can be stored.

When being attached to the first money handling apparatus 1, the coin cassette 41 and the banknote cassette 42 are attached to different attachment units. In the first money handling apparatus 1, a coin-only outlet is provided for the attachment unit for the coin cassette 41, and a banknote-only outlet is provided for the attachment unit for the banknote cassette 42.

A store clerk transports the money cassette 4, in which money discharged from the second money discharge unit 13A is stored, by hand or by placing it on a dolly or the like. As described above, in this embodiment, the transport manner using the money cassette 4 is an example of the second transport manner in an embodiment of the present disclosure. The transport manner using the money cassette 4 comprises a manner of transporting only coins stored in the coin cassette 41, a manner of transporting only banknotes stored in the banknote cassette 42, and a manner of transporting coins stored in the coin cassette 41 and banknotes stored in the banknote cassette 42 at the same time.

The description returns to the first money handling apparatus 1A. The discharge control unit 11A controls discharge of money from the first money discharge unit 12A and discharge of money from the second money discharge unit 13A. The discharge control unit 11A is a processor such as a CPU. In an exemplary implementation, the discharge control unit 11A is encompassed by or may include processing circuitry which will be discussed later with respect to FIG. 7. For example, in response to an operation of a store clerk on an operation unit of the first money handling apparatus 1A, the discharge control unit 11A causes money to be discharged from the first money discharge unit 12A or the second money discharge unit 13A.

Upon discharge of the money from the first money discharge unit 12A, the discharge control unit 11A generates first information indicating that money is discharged from the first money discharge unit 12A. Alternatively, upon discharge of the money from the second money discharge unit 13A, the discharge control unit 11A generates second information indicating that money is discharged from the second money discharge unit 13A.

As illustrated in FIG. 5, the second money handling apparatus 2 comprises a reception control unit 21A, a first money reception unit 22A, and a second money reception unit 23A. The first money reception unit 22A receives money transported in the transport manner using a transport unit other than the money cassette 4.

The first money reception unit 22A receives coins in a loose state and banknotes in a loose state from a coin-only inlet that receives loose coins and a banknote-only inlet that receives loose notes, respectively. The money received by the first money reception unit 22A is stored in a storage unit. The storage unit is constituted of a coin-only storage unit and a banknote-only storage unit.

The second money reception unit 23A receives money transported in the transport manner using the money cassette 4. The attachment unit for the coin cassette 41 and the attachment unit for the banknote cassette 42 are provided for the second money reception unit 23A. A coin-only inlet and a banknote-only inlet are provided for the attachment unit for the coin cassette 41 and the attachment unit for the banknote cassette 42, respectively. These inlets are closed unless the money cassette 4 is attached.

The second money reception unit 23A comprises a lock mechanism 231. The lock mechanism 231 is configured to prevent the money cassette 4 from being attached to an attachment unit unless necessary. The lock mechanism 231 is controlled by the reception control unit 21A.

On the basis of the first information or second information received from the first money handling apparatus 1A, the reception control unit 21A causes the first money reception unit 22A or the second money reception unit 23A to receive money. When the first information is received, the reception control unit 21A causes the first money reception unit 22A to operate. On the other hand, when the second information is received, the reception control unit 21A controls the lock mechanism 231 of the second money reception unit 23A to allow the money cassette 4 to be attached and also causes the second money reception unit 23A to operate.

The management apparatus 3 manages money stored in the second money handling apparatus 2A. The management apparatus 3 also manages depositing and dispensing of money in the second money handling apparatus 2A. Note that the management apparatus 3 is configured as a separate unit from the second money handling apparatus 2A in the example illustrated in FIG. 5, but may also be configured to be integrated with the second money handling apparatus 2A.

The management apparatus 3 comprises, for example, a processor such as a CPU and a memory device (e.g., flash memory or hard disk drive (HDD)) and implements each function by the processor executing a program read out from the memory device. In an exemplary implementation, the management apparatus 3 is encompassed by or may include processing circuitry which will be discussed later with respect to FIG. 7.

The management apparatus 3 is communicably connected to the first money handling apparatus 1A and the second money handling apparatus 2A by wired or wireless communication. The management apparatus 3 stores the first information or second information received from the first money handling apparatus 1A in a memory unit, for example. In addition, the management apparatus 3 transmits the first information or second information to the second money handling apparatus 2A as necessary. This embodiment will describe a case where the management apparatus 3 transmits the first information or second information to the second money handling apparatus 2A each time the first information or second information is received from the first money handling apparatus 1A. However, the management apparatus 3 may also transmit the first information or second information only when requested from the second money handling apparatus 2A.

[Operations]

Figure 6:
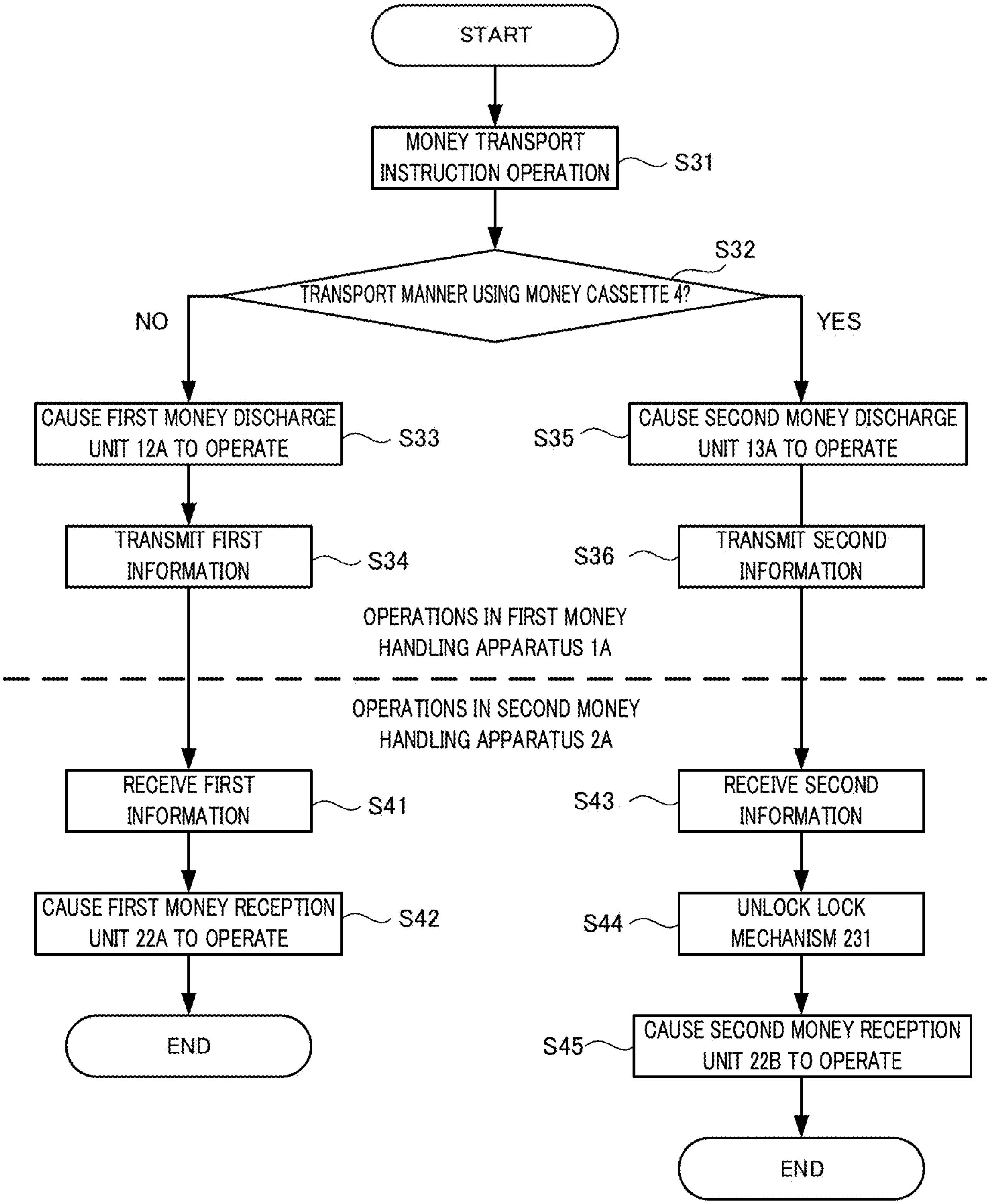
FIG. 6 is a flowchart for describing operations of the money handling system according to one or more aspects of the disclosed subject matter.

Now, referring to FIG. 6, operations of the money handling system 100A will be described below. Note that operations above the broken line in FIG. 6, that is, steps S31 to S36, are performed by the first money handling apparatus 1A, and operations below the broken line, that is, steps S41 to S45, are performed by the second money handling apparatus 2A.

In step S31, in the first money handling apparatus 1A, a store clerk inputs an instruction operation for transporting money in the first money handling apparatus 1A to the second money handling apparatus 2A. This instruction operation comprises an operation of designating the amount of money to be transported. The instruction operation further comprises a selection operation of selecting a unit for transporting money. The instruction operation further comprises a selection operation of selecting transport of only coins, transport of only banknotes, or transport of both coins and banknotes.

In step S32, on the basis of the instruction operation in step S31, the discharge control unit 11A determines whether the transport is in the transport manner using the money cassette 4. When it is determined that the transport manner without using the money cassette 4 is selected, the discharge control unit 11A advances the process to step S33. On the other hand, when it is determined that the transport manner using the money cassette 4 is selected, the discharge control unit 11A advances the process to step S35.

In step S33, the discharge control unit 11A causes the first money discharge unit 12A to operate. Thus, money in a loose state is discharged. The store clerk transports the money in a loose state to the second money handling apparatus 2A by hand or by putting it in a container such as a bag.

In step S34, the discharge control unit 11A generates first information indicating that money is discharged in a state suitable for the transport manner without using the money cassette 4 and transmits the first information to the management apparatus 3. Thus, the first information is received by the second money handling apparatus 2A via the management apparatus 3. The first information comprises any of information indicating transport of only coins, information indicating transport of only banknotes, or information indicating transport of both coins and banknotes.

In step S41, the reception control unit 21A of the second money handling apparatus 2A receives the first information. Thus, the second money handling apparatus 2A can determine that money will be transported in the transport manner without using the money cassette 4.

Thus, in step S42, the reception control unit 21A causes the first money reception unit 22A to operate. Thus, for example, an inlet for receiving loose money is open, and the second money handling apparatus 2A becomes capable of receiving loose money. The store clerk can smoothly deposit the money transported from the first money handling apparatus 1A without having to perform any operation on the second money handling apparatus 2A.

On the other hand, in step S35, the discharge control unit 11A causes the second money discharge unit 13A to operate. Thus, money is discharged into the money cassette 4 and stored therein, the money cassette 4 being attached to the first money handling apparatus 1A in advance. The store clerk transports the money cassette 4 to the second money handling apparatus 2A by hand or by placing it on a dolly or the like.

When transport of only coins is selected in the instruction operation in step S31, in step S35, the discharge control unit 11A controls the second money discharge unit 13A to discharge coins into the coin cassette 41. In addition, when transport of only banknotes is selected in the instruction operation in step S31, in step S35, the discharge control unit 11A controls the second money discharge unit 13A to discharge banknotes into the banknote cassette 42. When transport of both coins and banknotes is selected in the instruction operation in step S31, in step S35, the discharge control unit 11A controls the second money discharge unit 13A to discharge coins into the coin cassette 41 and banknotes into the banknote cassette 42.

In step S36, the discharge control unit 11A generates second information indicating that money is discharged in a state suitable for the transport manner using the money cassette 4 and transmits the second information to the management apparatus 3. Thus, the second information is received by the second money handling apparatus 2A via the management apparatus 3. The second information comprises any of information indicating transport of only coins using the coin cassette 41, information indicating transport of only banknotes using the banknote cassette 42, or information indicating transport of both coins and banknotes.

In step S43, the reception control unit 21A of the second money handling apparatus 2A receives the second information. Thus, the second money handling apparatus 2A can determine that money will be transported in the transport manner using the money cassette 4. In addition, since the second information comprises information indicating any of only coins, only banknotes, or both coins and banknotes are to be transported, the second money handling apparatus 2A can determine which of the coin cassette 41 and the banknote cassette 42 is used to transport the money.

Thus, in step S44, the reception control unit 21A unlocks the lock mechanism 231 for attaching the money cassette 4. In addition, when it is determined that coins are to be transported by using the coin cassette 41, the reception control unit 21A unlocks the lock mechanism 231 so that the coin cassette 41 can be attached; when it is determined that banknotes are to be transported by using the banknote cassette 42, the reception control unit 21A unlocks the lock mechanism 231 so that the banknote cassette 42 can be attached.

Subsequently, in step S45, the reception control unit 21A causes the second money reception unit 23A to operate. Thus, for example, an inlet corresponding to the money cassette 4 is open, and the money can be received from the money cassette 4. The store clerk can smoothly deposit the money transported from the first money handling apparatus 1A without having to perform any operation on the second money handling apparatus 2A.

Effects

As described above, according to the money handling system 100A according to Embodiment 4, the first money handling apparatus 1A generates first information when money is discharged in a state suitable for the transport manner using a transport unit other than the money cassette 4 (example of the first transport manner in an embodiment of the present disclosure) and generates second information when money is discharged in a state suitable for the transport manner using the money cassette 4 (example of the second transport manner in an embodiment of the present disclosure), and transmits the first information or second information to the second money handling apparatus 2A via the management apparatus 3.

The second money handling apparatus 2A having received the first information or second information can determine in advance the transport manner in which the money is to be transported before a store clerk transports the money. Thus, without the store clerk performing, for example, an operation of inputting the transport manner of the transported money, the second money handling apparatus 2A can cause a reception unit corresponding to the transport manner, which is either the first money reception unit 22A or the second money reception unit 23A, to operate. Thus, the store clerk can deposit the transported money in the second money handling apparatus 2A effortlessly.

In addition, the second money handling apparatus 2A can perform a deposit preparation operation such as an operation of unlocking the lock mechanism 231 or an operation of opening an inlet, for example, before the store clerk transports the money. Thus, the money can be deposited in the second money handling apparatus 2A more smoothly and more quickly than in a case where the second money handling apparatus 2A starts the deposit preparation operation at a timing at which an operation of depositing the transported money is received.

According to the money handling system 100A according to Embodiment 4, when the first information is received, the second money handling apparatus 2A does not unlock the lock mechanism 231 that prevents the money cassette 4 from being attached. This can prevent wrong attachment of the money cassette 4.

Modification Examples

The configuration and operations of the money handling system 100A described above in Embodiment 4 are examples of the present disclosure, and various modifications can be made. Now, modification examples of the money handling system 100A will be described below.

Modification Example 1

The money handling system 100A generates the second information when money is discharged from the first money handling apparatus 1A in a state suitable for the transport manner using the money cassette 4. However, as in the operations in Embodiment 2 illustrated in FIG. 3, the first money handling apparatus 1A may generate no information when money is discharged in a state suitable for the transport manner using the money cassette 4.

In this case, when the second money handling apparatus 2A does not receive the first information before or at a timing at which a store clerk who transports the money to the second money handling apparatus 2A by using the money cassette 4 performs a deposit request operation on the second money handling apparatus 2A, the second money handling apparatus 2A may cause the second money reception unit 23A, which receives money transported by using the money cassette 4, to operate.

Modification Example 2

In the money handling system 100A, the first or second information transmitted from the first money handling apparatus 1A to the management apparatus 3 is transmitted from the management apparatus 3 to the second money handling apparatus 2A. However, the management apparatus 3 may refrain from transmitting, to the second money handling apparatus 2A, the received first or second information unless a request from the second money handling apparatus 2A is made. The request from the second money handling apparatus 2A is made, for example, when the second money handling apparatus 2A requests the management apparatus 3 to transmit the first or second information, when delivered, every predetermined time. Alternatively, the request from the second money handling apparatus 2A may be made, for example, when the second money handling apparatus 2A requests the management apparatus 3 to transmit the first or second information, when delivered, at a timing at which a store clerk performs a deposit request operation on the second money handling apparatus 2A.

Modification Example 3

The first money handling apparatus 1A may also transmit the first or second information directly to the second money handling apparatus 2A instead of transmission via the management apparatus 3. In this case, the first money handling apparatus 1A may transmit the first or second information to the second money handling apparatus 2A at a timing of generating the first or second information or in response to a request from the second money handling apparatus 2A.

Modification Example 4

In the money handling system 100A, the first information is information indicating that money is discharged in a state suitable for a transport manner using a transport unit other than the money cassette 4. However, the first information may also be, for example, information indicating that money is in a state suitable for the transport manner using a transport unit other than the money cassette 4. In such a case, for example, when a store clerk puts money discharged from the first money handling apparatus 1A into the money cassette 4 by hand, the first money handling apparatus 1A does not generate the first information. Thus, when a store clerk puts money discharged from the first money handling apparatus 1A into the money cassette 4 by hand, the second money handling apparatus 2A can cause the second money reception unit 23A, corresponding to the transport manner using the money cassette 4, to operate.

Modification Example 5

A case where the first money handling apparatus 1A is a single apparatus in the money handling system 100A has been described above. However, when there are a plurality of first money handling apparatuses 1A, each one of the first money handling apparatuses 1A may generate the first or second information, and the management apparatus 3 may manage the first or second information generated by the first money handling apparatus 1A and identification information of the corresponding first money handling apparatus 1A in association with each other. This can handle a case where money is transported from the plurality of first money handling apparatuses 1A to the second money handling apparatus 2A in the transport manner using the money cassette 4 and the transport manner without using the money cassette 4.

Modification Example 6

A case where money is transported from the first money handling apparatus 1A, which is a cash settlement apparatus, to the second money handling apparatus 2A, which is a cash accounting apparatus, for collecting proceeds from sales or the like in the money handling system 100A has been described above. For example, in a case of refilling the cash settlement apparatus with a change fund, money needs to be transported from the cash accounting apparatus to the cash settlement apparatus. Such a case can be handled when the second money handling apparatus 2A further comprises a first money discharge unit that discharges money in a state suitable for the transport manner using a transport unit other than the money cassette 4 and a second money discharge unit that discharges money in a state suitable for the transport manner using the money cassette 4 and when the first money handling apparatus 1A further comprises a first money reception unit that receives money transported in the transport manner using a transport unit other than the money cassette 4 and a second money reception unit that receives money transported in the transport manner using the money cassette 4.

That is, in a case where the cash settlement apparatus needs to be refilled with a change fund, the second money handling apparatus 2A generates the first information when money is discharged from the first money discharge unit, or generates the second information when money is discharged from the second money discharge unit, and causes the first or second money reception unit to operate in accordance with the first or second information received by the first money handling apparatus 1A. Thus, regardless of using or not using the money cassette 4, the time and efforts of a store clerk for depositing money in the first money handling apparatus 1A can be reduced.

The transport unit to be used is selected by the store clerk's operation on the first money handling apparatus 1A in the money handling system 100A. However, the management apparatus 3 or the second money handling apparatus 2A may suggest or present the transport unit to be used to the store clerk, for example, in accordance with a time slot.

An example will be described. For example, before a store is open, in many cases, the first money handling apparatus 1A, which is a cash settlement apparatus, is refilled with a change fund from the second money handling apparatus 2A, which is a cash accounting apparatus. In addition, after the store is closed, in many cases, proceeds from sales are collected from the first money handling apparatus 1A, which is a cash settlement apparatus, to the second money handling apparatus 2A, which is a cash accounting apparatus. Furthermore, during business hours of the store, in some cases, the first money handling apparatus 1A is be refilled with a comparatively small amount of change fund from the second money handling apparatus 2A, but proceeds from sales are unlikely to be collected from the first money handling apparatus 1A to the second money handling apparatus 2A.

A large amount of money is transported more safely by being stored in the money cassette 4 than by being carried by a store clerk by hand or by putting it in a bag. Thus, for example, in response to the store clerk's dispense (discharge) request operation on the first money handling apparatus 1A or the second money handling apparatus 2A, the management apparatus 3 refers to the current time, selects a transport unit in accordance with the time, and presents it to the store clerk.

For example, during a time slot before the store is open, in response to a money dispense request operation on the second money handling apparatus 2A, the management apparatus 3 causes a display unit or the like of the second money handling apparatus 2A to display a message that recommends transport using the money cassette 4. Alternatively, the management apparatus 3 may force the second money handling apparatus 2A to discharge money into the money cassette 4.

For example, during a time slot after the store is closed, in response to a money dispense request operation on the first money handling apparatus 1A, the management apparatus 3 causes a display unit or the like of the first money handling apparatus 1A to display a message that recommends transport using the money cassette 4. Alternatively, the management apparatus 3 may force the first money handling apparatus 1A to discharge money into the money cassette 4.

For example, during the business hours, in response to a money dispense request operation on the second money handling apparatus 2A, the management apparatus 3 causes a display unit or the like of the second money handling apparatus 2A to display a message that recommends transport without using the money cassette 4. Alternatively, the management apparatus 3 may force the second money handling apparatus 2A to discharge loose money.

Such a configuration can reduce the efforts of the store clerk because the store clerk does not need to perform an operation of selecting the transport unit when performing a dispense request operation. Although the management apparatus 3 refers to the time and presents the transport unit in the description of Modification Example 6 above, for example, the first money handling apparatus 1A or the second money handling apparatus 2A that receives a dispense request operation may refer to the time and may present the transport unit.

Modification Example 7

The transport unit to be used is selected by a store clerk's operation on the first money handling apparatus 1A in the money handling system 100A. However, the management apparatus 3 may memorize the transport unit that is used in the previous transport, and, in response to an operation for dispensing money being performed on the first money handling apparatus 1A, may control the first money handling apparatus 1A to automatically select the same transport unit as the previous one.

Such a configuration can reduce the efforts of the store clerk because the store clerk does not need to perform an operation of selecting the transport unit when performing a dispense request operation. When the money handling system 100A comprises a plurality of first money handling apparatuses 1A, the previous transport unit may be memorized for each of the first money handling apparatuses 1A.

Although the management apparatus 3 memorizes the previous transport unit in the description of Modification Example 7 above, for example, the first money handling apparatus 1A may memorize the previous transport unit and may automatically select the previous transport unit in response to the next dispense request.

Figure 7:
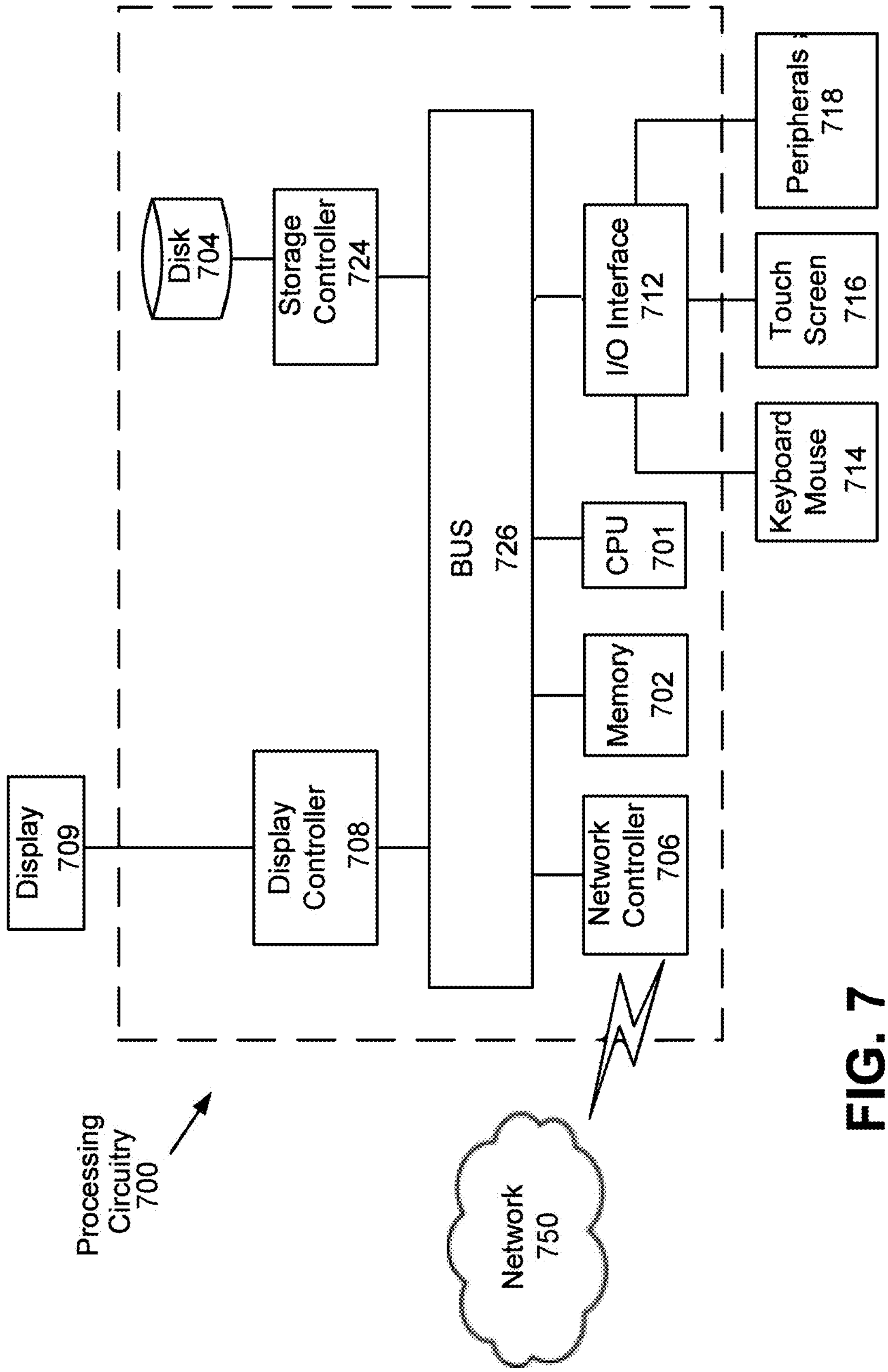
FIG. 7 is a block diagram of processing circuitry that performs computer-based operations in accordance with the present disclosure.

FIG. 7 is a block diagram of processing circuitry that performs computer-based operations in accordance with the present disclosure. FIG. 7 illustrates processing circuitry 700 which is included in or encompasses the discharge control unit 11, which is a component of the first money handling apparatus 1. Additionally, processing circuitry 700 is included in or encompasses the reception control unit 21, which is a component of the second money handling apparatus 2. Additionally, processing circuitry 700 is included in or encompasses the management apparatus 3.

Processing circuitry 700 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 7, the processing circuitry 700 includes a CPU 701 which performs one or more of the control processes discussed in this disclosure. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 700 communicates, such as a server or computer. The processes may also be stored in network based storage, cloud-based storage or other mobile accessible storage and executable by processing circuitry 700.

Further, the claimed advancements may be provided as a utility application, background daemon, or component of an operating system, or combination thereof, executing in conjunction with CPU 701 and an operating system such as Microsoft Windows, UNIX, Solaris, LINUX, Apple MAC-OS, Apple iOS and other systems known to those skilled in the art.

The hardware elements in order to achieve the processing circuitry 700 may be realized by various circuitry elements. Further, each of the functions of the above described embodiments may be implemented by circuitry, which includes one or more processing circuits. A processing circuit includes a particularly programmed processor, for example, processor (CPU) 701, as shown in FIG. 7. A processing circuit also includes devices such as an application specific integrated circuit (ASIC) and conventional circuit components arranged to perform the recited functions.

In FIG. 7, the processing circuitry 700 may be a computer or a particular, special-purpose machine. Processing circuitry 700 is programmed to execute processing to control terminal device 10/server device 20.

Alternatively, or additionally, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The processing circuitry 700 in FIG. 7 also includes a network controller 706, such as an Ethernet PRO network interface card, for interfacing with network 750. As can be appreciated, the network 750 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 750 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 706 may be compliant with other direct communication standards, such as Bluetooth, a near field communication (NFC), infrared ray or other.

The processing circuitry 700 further includes a display controller 708, such as a graphics card or graphics adaptor for interfacing with display 709, such as a monitor. An I/O interface 712 interfaces with a keyboard and/or mouse 714 as well as a touch screen panel 716 on or separate from display 709. I/O interface 712 also connects to a variety of peripherals 718.

The storage controller 724 connects the storage medium disk 704 with communication bus 726, which may be an ISA, EISA, VESA, PCI, or similar, for interconnecting all of the components of the processing circuitry 700. A description of the general features and functionality of the display 709, keyboard and/or mouse 714, as well as the display controller 708, storage controller 724, network controller 706, and I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

INDUSTRIAL APPLICABILITY

The present disclosure is useful for a money handling system comprising a money handling apparatus for depositing and dispensing money.

The invention claimed is:

1. A money handling system, comprising:
- a first money handling apparatus comprising
  - a first money outlet that discharges money in a state suitable for a first transport manner,
  - a second money outlet that discharges money in a state suitable for a second transport manner, and
  - first processing circuitry configured to control the first money outlet and the second money outlet; and
- a second money handling apparatus comprising
  - a first money receiver that receives money transported in the first transport manner,
  - a second money receiver that receives money transported in the second transport manner and that comprises a lock mechanism that prevents a money cassette from being attached, and second processing circuitry configured to control the first money receiver and the second money receiver and perform a deposit preparation operation for the first money receiver or the second money receiver before the money is transported from the first money handling apparatus to the second money handling apparatus, wherein the first processing circuitry is further configured to transmit first information indicating that money has been discharged from the first money outlet in a state suitable for the first transport manner, or second information indicating that money is discharged in a state suitable for the second transport manner using the money cassette, and the second processing circuitry is further configured to cause the first money receiver to operate, in a case that the first information is received, and control the lock mechanism to allow the money cassette to be attached to the second money receiver, in a case that the second information is received, and in a case that the first money receiver is to receive money, the second processing circuitry is further configured to cause the lock mechanism to operate and set a state where the money cassette is incapable of being attached to the second money receiver, wherein the first transport manner and the second transport manner are transport manners that are different from each other, the first transport manner is the transport manner using a transport unit other than the money cassette, the second transport manner is the transport manner using the money cassette, and the money cassette is used for transporting the money from the first money handling apparatus to the second money handling apparatus which is independent from the first money handling apparatus wherein the first money handling apparatus memorizes a previous money cassette and automatically selects the previous money cassette in response to a next dispense request.

2. The money handling system according to claim 1, wherein the second information indicates that money has been discharged from the second money outlet, and the second processing circuitry is further configured to cause the second money receiver to operate, in a case that the second information is received.

3. The money handling system according to claim 1, wherein the first processing circuitry is further configured to transmit the first information in a case that money is discharged from the first money handling apparatus.

4. The money handling system according to claim 1, wherein the first processing circuitry is further configured to transmit the first information in a case that a transmission request is received from the second processing circuitry.

5. The money handling system according to claim 1, further comprising third processing circuitry configured to receive the first information from the first processing circuitry and transmit the first information to the second processing circuitry.

6. The money handling system according to claim 1, wherein the second transport manner is a manner in which money is transported in a state of being stored in the money cassette that is configured to be capable of being attached to the second money outlet and also capable of being removed from the second money outlet, and the second money receiver is configured such that the money cassette is capable of being attached and removed.

7. A money handling apparatus, comprising:

a first money receiver that receives money transported in a first transport manner;

a second money receiver that receives money transported in a second transport manner and that comprises a lock mechanism that prevents a money cassette from being attached; and second processing circuitry configured to control the first money receiver and the second money receiver and perform a deposit preparation operation for the first money receiver or the second money receiver before the money is transported from the first money handling apparatus to the second money handling apparatus, wherein the second processing circuitry is further configured to cause the first money receiver to operate, in a case that first information indicating that money is in a state suitable for the first transport manner is received, and control the lock mechanism to allow the money cassette to be attached to the second money receiver, in a case that second information is received, the second information indicating that money is discharged in a state suitable for the second transport manner using the money cassette, and in a case that the first money receiver is to receive money, the second processing circuitry is further configured to cause the lock mechanism to operate and set a state where the money cassette is incapable of being attached to the second money receiver, wherein the first transport manner and the second transport manner are transport manners that are different from each other, the first transport manner is the transport manner using a transport unit other than the money cassette, the second transport manner is the transport manner using the money cassette, and the money cassette is used for transporting the money from the first other money handling apparatus which is independent from the money handling apparatus to the money handling apparatus wherein the first money handling apparatus memorizes a previous money cassette and automatically selects the previous money cassette in response to a next dispense request.

8. A money handling method, comprising:

discharging, from a first money handling apparatus, money in a state suitable for a first transport manner or in a state suitable for a second transport manner;

transmitting first information indicating that money discharged from the first money handling apparatus is in a state suitable for the first transport manner, or second information indicating that money is discharged in a state suitable for the second transport manner using a money cassette; and receiving money, in a case that the money is discharged from the first money handling apparatus, by performing a deposit preparation operation for a first money receiver or a second money receiver before the money is transported from the first money handling apparatus to the second money handling apparatus, by selecting a first money receiver from among a plurality of money receivers of a second money handling apparatus in a case that the second money handling apparatus receives the first information, or by selecting a second money receiver comprising a lock mechanism that prevents the money cassette from being attached and controlling the lock mechanism in a case that the second information is received, and causing the lock mechanism to operate and set a state where the money cassette is incapable of being attached to the second money receiver in a case that the first money receiver is to receive money;

wherein the first transport manner and the second transport manner are transport manners that are different from each other, the first transport manner is the transport manner using a transport unit other than the money cassette, the second transport manner is the transport manner using the money cassette, and the money cassette is used for transporting the money from the first money handling apparatus to the second money handling apparatus which is independent from the first money handling apparatus wherein the first money handling apparatus memorizes a previous money cassette and automatically selects the previous money cassette in response to a next dispense request.

9. The money handling method of claim 8, further comprising:

causing another money receiver of the plurality of money receivers to operate in a case that the first information is not received.

10. The money handling method of claim 9, wherein the second transport manner is a manner in which money is transported in a state of being stored in the money cassette that is configured to be capable of being attached to the first money handling apparatus and also capable of being removed from the first money handling apparatus, and the another money receiver is configured such that the money cassette is capable of being attached and removed.

11. The money handling method of claim 10, wherein the another money receiver comprises a lock mechanism that prevents the money cassette from being attached, and the method further comprises in a case that the selected money receiver is to receive money, causing the lock mechanism to operate and set a state where the money cassette is incapable of being attached to the another money receiver.

12. The money handling system according to claim 1, wherein the first money handling apparatus does not generate the first information in a case that the money is discharged in a state suitable for the second transport manner.

* * * * *